United States Patent Office 2,779,807
Patented Jan. 29, 1957

2,779,807

PURIFICATION OF METHYLNAPHTHALENES WITH PERACIDS

Wilbie S. Hinegardner and Jerome W. Sprauer, Niagara Falls, N. Y., assignors to E. I. du Pont de Nemours & Company, Wilmington, Del., a corporation of Delaware No Drawing. Application October 23, 1953,
Serial No. 388,046

16 Claims. (Cl. 260—674)

This invention relates to a method for purifying methylnaphthalenes.

A known method for producing hydrogen peroxide involves alternately hydrogenating and oxygenating solutions of alkylanthraquinone and/or tetrahydroalkylanthraquinone intermediates, the hydrogen peroxide being formed in the oxygenation stage of the cycle where the alkylanthraquinone intermediate is regenerated. In such systems, hydrogenation of the alkylanthraquinone to the corresponding anthrahydroquinone is effected in the presence of a catalyst such as finely-divided nickel or metallic palladium on an activated alumina.

The solvents generally regarded as most suitable for dissolving the intermediates in processes of the above type are mixtures, one constituent of which (e. g. cyclohexanol) is a good solvent for the reduced form and another constituent of which (e. g. benzene) is a good solvent for the oxidized form of the intermediate. The methylnaphthalenes, including the mono- and dimethylnaphthalenes, are excellent solvents for the intermediates in the oxidized form, and they possess certain properties which make their use in solvent mixtures of the type indicated highly advantageous. However, the methylnaphthalenes as they are sold commercially almost invariably contain impurities whose presence in working solutions of the hydrogen peroxide-synthesizing intermediate is quite harmful and objectionable.

The identities of the above impurities are not known, but their effects are readily apparent. Some function as poisons for the hydrogenation catalyst, thus seriously affecting initial operation of the hydrogenation step. Others are strongly adsorbed, or yield compounds which are so adsorbed, by the catalyst, thus reducing catalyst activity and life. The same or similar impurities contaminate, or yield compounds which contaminate, the peroxide product. It is, therefore, important when using methylnaphthalenes as working solution constituents that a practical way be found for purifying commercial methylnaphthalenes prior to their use so as to remove or render innocuous impurities of the type indicated.

One object of the invention is to provide a method of purifying methylnaphthalenes. A further object is a method for treating commercial methylnaphthalenes so as to render them more suitable for use as working solution constituents in cyclic processes of the type indicated above for producing hydrogen peroxide. A particular object is a method for treating methylnaphthalenes which contain impurities whose presence in cyclic systems of the type indicated adversely affect the hydrogenation catalyst, either initially or during continued use, and/or contaminate the hydrogen peroxide product, whereby such impurities are removed at least in part or are rendered less harmful. Still further objects will be apparent from the following description.

The above objects are accomplished in accordance with the invention by treating a methylnaphthalene which contains impurities of the type indicated with an aliphatic peracid and separating the purified methylnaphthalene from the resulting reaction mixture. The peracid can be formed in situ during use by the reaction of hydrogen peroxide with an aliphatic carboxylic acid, or a preformed peracid can be employed. Separation of the purified methylnaphthalene can be effected by fractional distillation, or the undesired impurities present after the reaction with the peracid can be removed by selective adsorption or extraction methods.

The commercial methylnaphthalenes are known to comprise mixtures of various substances. Thus, a commercial "monomethylnaphthalene" from a petroleum source contains about 40% alpha-methylnaphthalene, a large proportion of alkylnaphthalenes, mostly mixed dimethylnaphthalenes, substantial amounts of saturated aliphatic and naphthenic compounds and trace amounts of unsaturated aliphatic compounds. Other objectionable impurities probably include trace amounts of sulfur and nitrogen compounds. Whatever the objectionable impurities may be, it has been found that they react actively with aliphatic peracids to form products which can be readily separated. Alpha-methylnaphthalene, beta-methylnaphthalene and mixed dimethylnaphthalenes available from coal-tar sources also contain objectionable impurities which react with performic acid to yield products which can be readily separated.

The treatment with the peracid can be carried out at any temperature from the freezing point up to the boiling point of the methylnaphthalene, the higher the temperature the greater being the rate of reaction between the peracid and the impurities. Temperatures of the order of 20 to 60° C. are generally satisfactory and preferred. At such temperatures, reaction times of 3 to 24 hours are preferred but longer or shorter times can be employed to achieve significant beneficial results. Generally, the higher the temperature the shorter the time required to obtain a given beneficial effect. Best results are obtained under any given temperature and time conditions when the reaction mixture is agitated. Pressure does not appear to be an important factor and any pressure can be used provided it is sufficient to maintain the mixture in the liquid phase.

The amount of peracid to be used will depend somewhat upon the particular methylnaphthalene product being treated and the degree of purification desired. In most instances, amounts varying from 2 to 25% based upon the weight of the methylnaphthalene will give excellent results, and such amounts are generally preferred. When using such amounts, the peracid will usually be completely reacted or decomposed at the end of the treatment under the preferred time conditions. Significant improvent in quality can be achieved with smaller amounts, e. g. as low as about 0.1%. Also, much larger amounts e. g. up to 50% and higher, can be used, but such larger amounts are wasteful. It will often be advantageous to add the peracid, or the compounds forming the same in situ, incrementally since the peracid is used more efficiently under such circumstances. If desired, the reaction products can be separated from the methylnaphthalene after reaction with one or more increments of the peracid, after which the methylnaphthalene can be treated with more of the peracid.

A preformed peracid can be used effectively, but its formation in situ is usually more convenient and preferred. Formation in situ can be accomplished by adding any of the reagents known to react with each other to produce the chosen peracid. Thus, aqueous hydrogen peroxide, e. g. having an $H_2O_2$ content of at least 27%, can be added along with concentrated formic acid, e. g. aqueous formic acid containing at least 75% HCOOH. Either reactant can be used in considerable excess but an excess of formic acid, e. g. at least 2 to 1 moles of HCOOH per mole of $H_2O_2$ is preferred since excess formic acid serves to moderate the reaction and to avoid formation of hazardous concentrations of performic acid. Most preferably 12 to 25 g. of HCOOH, e. g. as aqueous 90% formic acid, and 2–4 g. of $H_2O_2$, e. g. as aqueous 35% hydrogen peroxide, will be used per 100 g. of methylnaphthalene. The reactants can be added in any order or simultaneously, a convenient way being first to add the formic acid to the methylnaphthalene and then to add to the resulting mixture the hydrogen peroxide at a rate such as will maintain the temperature at the desired level. Temperature control can also be achieved by cooling or heating the reaction mixture as required.

Other aliphatic peracids can be used in place of performic acid with similar results. Those containing up to 4 carbon atoms constitute a preferred group. If the peracid is formed in situ, for example by reacting hydrogen peroxide with acetic, propionic, n-butyric or isobutyric acid, it is preferred that a small amount, e. g. 0.5 to 5% based upon the weight of the aliphatic acid used, of a strong mineral acid such as concentrated sulfuric acid also be added to catalyze formation of the peracid. Such a catalyst can also be used, but is not generally necessary, when performic acid is to be formed from hydrogen peroxide and formic acid.

The invention is illustrated by the following examples. In the examples and elsewhere in the specification, all percentages given are precentages by weight.

*Example 1*

1474 g. of a commercial "methylnaphthalene" of petroleum origin containing about 40% alpha-methylnaphthalene and other materials as previously indicated, was added to a reaction flask provided with a stirrer, a thermometer and a cooling bath. While operating the stirrer, there were added in succession 103 g. of aqueous 90% formic acid and 45 g. of aqueous 35% hydrogen peroxide, after which the mixture was stirred for 3 hours while controlling the temperature at 32 to 40° C. The same amounts of formic acid and hydrogen peroxide were again added and the mixture was stirred for an additional 3 hours at the same temperature. The acid layer was separated from the hydrocarbon layer and the latter was extracted twice with 100 ml. portions of aqueous 5% sodium hydroxide and then with 100 ml. of aqueous 5% sodium bicarbonate. The hydrocarbon layer was then fractionally distilled at 22 mm. Hg absolute pressure using a short distillation column, the 90% middle cut being retained as the purified product.

The above purified product was found to have a "gum" content of 0.15%, which increased to 0.31% after being subjected to an accelerated stability test as described below. In comparison, the unpurified methylnaphthalene had a gum content of 0.10% which increased to 2.27% after being submitted to the same stability test.

The impurities herein referred to collectively as "gums" are those compounds which are readily adsorbed by hydrogenation catalysts and by microporous materials such as activated alumina. The gum contents in weight percentages, based upon the weights of the methylnaphthalenes tested, were determined by adsorbing the gums on activated alumina in a chromatographic column, washing the column with methylene chloride to remove hydrocarbons, eluting the gums with methanol and methanolic hydrochloric acid and then collecting the eluate, evaporating off the solvent and weighing the gum residue.

The accelerated stability test referred to above is carried out by adding 2.5 g. of aqueous 35% hydrogen peroxide to 25 g. of the methylnaphthalene being tested and then maintaining the resulting mixture at 100° C. for 24 hours while bubbling air at 20–40 ml. per minute through the mixture. It has been found that the gum content after being subjected to this test is a rough approximation of the stability of a methylnaphthalene against the formation of objectionable gums when the methylnaphthalene is used as a constituent of a working solution in long-time cyclic hydrogen peroxide synthesis operations under normal conditions of operations, e. g. at temperatures which do not exceed around 50° C. The accelerated stability test can also be applied to working solutions and the gum contents of the latter then determined as indicated above to provide a valuable indication of the stability of working solutions against gum formation during normal use.

*Example 2*

A hydrogen peroxide synthesis working solution comprising 20% 2-t-butylanthraquinone, 28% diisobutyl carbinol and 52% methylnaphthalene was prepared using the purified methylnaphthalene from Example 1. The gum content of the working solution was 0.07% which increased to 0.35% after being subjected to the accelerated stability test described above. In comparison, a corresponding working solution prepared using the unpurified methylnaphthalene of Example 1 had a gum content of 0.02% which increased to 0.83% after the accelerated stability test.

*Example 3*

The hydrogenatabilities of the two working solutions prepared as described in Example 2 were tested under identical conditions. In each case, hydrogen was passed at the rate of 1.5 liters per minute through 300 ml. of the working solution containing one gram of a palladium-on-activated alumina catalyst containing 0.6% palladium while maintaining the mixture at 35–36° C. The rate of hydrogenation was observed by periodically determining the extent to which the butylanthraquinone was converted to the anthrahydroquinone. The working solution containing the purified methylnaphthalene hydrogenated at the rate of 0.130 mole of anthrahydroquinone per hour per liter of solution, whereas the rate for the working solution containing the unpurified methylnaphthalene was only 0.096 mole.

*Example 4*

A sample of commercial methylnaphthalene of petroleum origin was treated with performic acid then extracted with aqueous sodium hydroxide and aqueous sodium bicarbonate substantially as described in Example 1. The hydrocarbon layer was then passed through a column of 48 to 100 mesh (Tyler standard sieve) activated alumina, the weight of the alumina used being equal to the weight of the hydrocarbon layer. The effluent purified methylnaphthalene had a gum content of 0.04% which increased to 0.12% after being subjected to the above accelerated stability test.

*Example 5*

A sample of commercial alpha-methylnaphthalene of coal tar origin was purified by the procedure described in Example 4. The gum content of the purified product after it had been subjected to the accelerated stability test was 0.29% as compared with 1.71% for the unpurified material which had also been subjected to the accelerated stability test.

When a working solution containing methylnaphthalene purified in accordance with the invention is extracted with aqueous hydrogen peroxide, the latter remains relatively odorless and its carbon content is not increased significantly. However, if there is added to such a working solution gum which has been separated from unpurified methylnaphthalene, the aqueous hydrogen peroxide extract of the working solution acquires a strong objectionable odor and its carbon content is detectably increased. Thus, purifying the methylnaphthalene constituent of the working solution by the present method significantly reduces contamination of the product hydrogen peroxide solution obtained by extracting the oxidized working solution with water.

The treatment with peracid converts undesirable impurities into products which can be readily separated from the methylnaphthalene. Examples 1 and 4 show effecting such separation by fractional distillation and by selective adsorption on an active adsorbent, respectively. Separation can also be effected by means of concentrated sulfuric acid which selectively extracts the undesired products resulting from the reaction with the peracid. Similarly, countercurrent extraction with diethylene glycol or aqueous methanol is also effective. However, separation by fractional distillation with two or three theoretical stages with recovery of about a 90% middle-cut as purified product, or by selectively adsorbing the undesired materials on an adsorbent such as activated alumina, is preferred. Other effective adsorbents are silica-alumina cracking catalyst, silica-magnesia, and synthetic zeolite.

It should be noted that merely subjecting the crude methylnaphthalene to fractional distillation or merely treating the same with activated alumina or with concentrated sulfuric acid, in the absence of the present pretreatment with a peracid, is incapable of achieving the degree of purification resulting from the present method. On the other hand, the present method comprising a treatment with a peracid followed by separating reaction products resulting from such treatment effects excellent purification and by its use commercial methylnaphthalene can be rendered much more suitable for use in working solutions for producing hydrogen peroxide.

We claim:

1. The method of purifying a methylnaphthalene comprising treating said methylnaphthalene with an aliphatic peracid and separating from said methylnaphthalene the products of the reaction of said peracid with impurities.

2. The method of claim 1 wherein the peracid is formed in situ.

3. The method of claim 1 wherein the products of the reaction of the peracid with the impurities are separated by fractional distillation.

4. The method of claim 1 wherein the products of the reaction of the peracid with the impurities are separated by being selectively extracted from the methylnaphthalene.

5. The method of claim 1 wherein the products of the reaction of the peracid with the impurities are separated from the methylnaphthalene by selective adsorption on an adsorbent material.

6. The method of claim 5 wherein the adsorbent material is activated alumina.

7. The method of claim 1 wherein the peracid contains 1 to 4 carbon atoms.

8. The method of claim 1 wherein the peracid is performic acid.

9. The method of purifying a methylnaphthalene containing impurities whose presence is objectionable in working solutions for the production of hydrogen peroxide by a method involving alternately hydrogenating and oxygenating an alkylanthraquinone intermediate dissolved in said working solution, said method comprising treating said methylnaphthalene with 0.1 to 50% of an aliphatic peracid, based upon the weight of the methylnaphthalene, at a temperature of 20 to 60° C., whereby to effect reaction between said peracid and said impurities, and separating the products of said reaction from the methylnaphthalene.

10. The method of claim 9 wherein the peracid contains 1 to 4 carbon atoms.

11. The method of claim 9 wherein the peracid is performic acid.

12. The method of claim 11 wherein the products of the reaction are separated by fractional distillation.

13. The method of claim 11 wherein the products of the reaction are separated by selective extraction.

14. The method of claim 11 wherein the products of the reaction are separated by adsorption on an adsorbent material.

15. The method of claim 11 wherein the products of the reaction are separated by adsorption on activated alumina.

16. The method of claim 11 wherein the performic acid is formed in situ by the reaction of hydrogen peroxide with formic acid.

References Cited in the file of this patent

UNITED STATES PATENTS

| 1,590,965 | Downs | June 29, 1926 |
| 2,282,514 | Fischer et al. | May 12, 1942 |

FOREIGN PATENTS

| 424,564 | Great Britain | Feb. 18, 1935 |

OTHER REFERENCES

Whitmore: "Organic Chemistry," D. Van Nostrand Co., New York, N. Y. (1937) page 295.

Richter: "Organic Chemistry," vol. I (1944), page 319, Nordeman Publishing Co., Inc., New York, N. Y.